United States Patent
Kojima et al.

(10) Patent No.: US 7,359,618 B2
(45) Date of Patent: Apr. 15, 2008

(54) INFORMATION RECORDING/REPRODUCING APPARATUS AND INFORMATION RECORDING/REPRODUCING METHOD

(75) Inventors: Toshiaki Kojima, Kanagawa (JP); Yoshinori Nakako, Kanagawa (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 10/416,360

(22) PCT Filed: Sep. 13, 2002

(86) PCT No.: PCT/JP02/09415

§ 371 (c)(1), (2), (4) Date: Oct. 27, 2003

(87) PCT Pub. No.: WO03/026287

PCT Pub. Date: Mar. 27, 2003

(65) Prior Publication Data

US 2004/0136684 A1 Jul. 15, 2004

(30) Foreign Application Priority Data

Sep. 13, 2001 (JP) ............................. 2001-277932

(51) Int. Cl.
  *H04N 5/91* (2006.01)
  *H04N 7/00* (2006.01)

(52) U.S. Cl. ........................................ 386/68; 386/46

(58) Field of Classification Search .................. 386/7, 386/68, 8, 6
See application file for complete search history.

(56) References Cited

U.S. PATENT DOCUMENTS

| 5,566,174 A * | 10/1996 | Sato et al. .................. 370/468 |
| 5,953,291 A * | 9/1999 | Yasukohchi et al. .......... 710/57 |
| 6,697,902 B1 * | 2/2004 | Sugimoto .................. 710/305 |
| 2001/0019657 A1 | 9/2001 | McGarth et al. |
| 2002/0057893 A1 * | 5/2002 | Wood et al. .................. 386/46 |
| 2004/0223733 A1 * | 11/2004 | Kojima ........................ 386/46 |

FOREIGN PATENT DOCUMENTS

| JP | 2000-285654 | 10/2000 |
| JP | 2001-94958 | 4/2001 |
| JP | 2001-216726 | 8/2001 |

* cited by examiner

Primary Examiner—Thai Q. Tran
Assistant Examiner—Anner Holder
(74) Attorney, Agent, or Firm—Frommer Lawrence & Haug LLP; William S. Frommer; Paul A. Levy (57) ABSTRACT

An information recording/playback apparatus capable of recording and playing back data on and from a magnetic tape through a network. A monitoring unit 15 regularly monitors the state of the data stored in a temporary storage unit 14. A first controlling unit 13 controls data transfer between a tape magnetic-storage medium 11 and the temporary storage unit 14 based on a result a of monitoring. A second controlling unit 16 controls information transfer between the temporary storage unit 14 and a network 21 based on the result a of monitoring. The first controlling unit 13 and the second controlling unit 16 do not interfere with each other and they independently operate asynchronously with each other. This asynchronous structure permits asynchronous data transfer to other apparatuses through an interface unit 17 and the network 21. The present invention can be applied to a digital VTR.

5 Claims, 9 Drawing Sheets

INFORMATION RECORDING/REPRODUCING APPARATUS AND INFORMATION RECORDING/REPRODUCING METHOD

TECHNICAL FIELD

The present invention relates to information recording/playback apparatuses and methods for recording and playing back information and, more particularly, to an information recording/playback apparatus and method capable of transmitting and receiving data through a network.

BACKGROUND ART

A variety of products having, for example, a magnetic structure, an optical structure, and a structure including a semiconductor memory, are commonly used as media and apparatuses for recording and playing back information. Particularly, magnetic-tape recording/playback apparatuses using magnetic-tape media for magnetic recording have a history of many years and wide performance and they are considered to continuously have an important role in future years.

The magnetic-tape recording/playback apparatuses are characterized in that the performance thereof is evaluated dependently on the performance of recording media (magnetic-tape media) and also characterized in that they adopt a structure giving synchronous operation. The magnetic-tape media are widely used as media involved in sequential recording and have a reputation in a broad range of applications due to the following:
(1) inexpensive bit cost
(2) a vast amount of bit capacity per roll
(3) high manageability owing to the removable media and the capability of managing them for every roll
(4) use for archives with a function of storing records for a long time.

Especially, the recording performance of the magnetic recording media depends on the coercive force and the chronological deterioration of the coercive force is determined from arrhenius plot. The chronological performance of the magnetic recording media is evaluated based on an inclination represented in a semilogarithmic scale. In the present circumstances, the function of storing records for a long time continues to improve along with the improvement and development of magnetic materials.

Meanwhile, a mechanism for reading and writing information based on the variation in magnetic flux density during a relative movement with respect to the head of a magnetic tape synchronously transfers the information to other apparatuses and devices. Hence, this mechanism is appropriate for direct information transfer that is synchronous with the other apparatuses and devices through, for example, a dedicated transmission path. Accordingly, known video tape recorders (hereinafter referred to as VTRS) and video cassette recorders (hereinafter referred to as VCRs), which are typical synchronous magnetic-tape recording/playback apparatuses, have been embodied separately or as complements or backups for random-access recording/playback apparatuses on the assumption of use of the dedicated transmission path.

As described above, in the known VTRs, which are referred to as linear devices, images and voices are all synchronously input and output. Hence, the playback operation of tape media at a sending VTR must be simultaneously and synchronously performed with the recording operation at a distributed server at a certain rate in a real time environment in order to copy the contents recorded on the tape medium from the VTR to the server or the like. For this reason, for example, the synchronous VTRs cannot play back video and voice data corresponding to five minutes over a time period of 30 minutes and they are not appropriate for recording the video and voice data corresponding to five minutes input over a time period of 30 minutes.

In order to control each device that transfers information under strict time management and to make the device follow the time restriction, the synchronous VTRs need to independently transmit video and voice data, time codes, control signals, and so on. The synchronous VTRs also need to change the connection or separately provide reverse connection for reversing the sending VTR and the distributed server, thus complicating the operation and disadvantageously increasing the production cost.

Application of a network environment, such as Ethernet (trademark), which is a typical local area network (LAN), is desirable for simplifying, for example, unifying the connection. However, there are some bottlenecks and problems to be resolved to connect the known synchronous VTRs as nodes to the communication network.

First, synchronous transmission of the time codes, the control signals, and delivery content through the communication network shared by a plurality of nodes is not assured, unlike the transmission through a dedicated transmission path, and asynchronous transmission of them prevails. Hence, the known synchronous VTRs are not accommodated to the transmission of the time codes, the control signals, and the delivery content.

Transmission of playback information from the synchronous VTRs or receipt of recording information therein by using a dedicated transmission path or a private communication network having an assured transmission rate does not produce problems with the recording or playback quality because of an assured fixed transmission rate. In contrast, the transmission rate of a network line shared by a plurality of nodes varies more than that of the dedicated transmission path and varies dependently on the amount of traffic at that time. Such dependency on the state of the line possibly creates problems with the quality and the like of the transmission information. For example, on the physical layer where the transmission rate cannot be maintained at a certain value due to the variation in traffic on, for example, the Ethernet (trademark), it is possible that data on the magnetic tape cannot be smoothly transmitted and received.

Additionally, the known synchronous VTRs are not appropriate for sequentially transmitting two scenes recorded on separate positions on a magnetic tape.

Furthermore, since other jobs are paused while one job is being processed in the known synchronous VTRs, there is a problem in that it takes a long time to complete all of the jobs.

DISCLOSURE OF INVENTION

In view of the foregoing, the present invention provides an information recording/playback apparatus capable of transmitting and receiving data recorded on or played back from a magnetic tape through a network, thereby overcoming the above-described drawbacks.

An information recording/playback apparatus according to the present invention includes temporary storage means for temporarily storing information played back from a tape magnetic-storage medium and the information to be recorded on the tape magnetic-storage medium; monitoring means for monitoring the stored volume in the temporary storage means; first controlling means for controlling the supply of the information from the tape magnetic-storage medium to the temporary storage means and for controlling the supply of the information from the temporary storage means to the tape magnetic-storage medium, based on a result of monitoring given by the monitoring means; communication means for communicating with an asynchronous communication channel; and second controlling means for controlling the supply of the information from the temporary storage means to the communication means and for controlling the supply of the information from the communication means to the temporary storage means, based on the result of monitoring.

The asynchronous communication channel communicating with the communication means may be a network including the Ethernet.

The monitoring means may compare the stored volume in the temporary storage means with predetermined lower limits and predetermined upper limits and may notify the first controlling means and the second controlling means of the comparison result.

The monitoring means may compare the stored volume in the temporary storage means with a first lower limit and a first upper limit in the playback of the information from the tape magnetic-storage medium and may compare the stored volume in the temporary storage means with a second lower limit and a second upper limit in the recording of the information on the tape magnetic-storage medium.

The first controlling means may suspend the playback of the information from the tape magnetic-storage medium when the stored volume in the temporary storage means is greater than or equal to the first upper limit; may resume the playback of the information from the tape magnetic-storage medium when the stored volume in the temporary storage means is less than or equal to the first lower limit; may suspend the recording of the information on the tape magnetic-storage medium when the stored volume in the temporary storage means is less than or equal to the second lower limit; and may resume the recording of the information on the tape magnetic-storage medium when the stored volume in the temporary storage means is greater than or equal to the second upper limit.

The first controlling means may preroll the tape magnetic-storage medium at the time of resumption of the suspended playback of the information from the tape magnetic-storage medium or at the time of resumption of the suspended recording of the information on the tape magnetic-storage medium.

The first controlling means may preroll the tape magnetic-storage medium for a longer time in the recording than in the playback.

The second controlling means may suspend the supply of the information to the communication means when the stored volume in the temporary storage means is less than or equal to the first lower limit and may resume the supply of the information to the communication means when the stored volume in the temporary storage means is greater than or equal to the first upper limit.

The information recording/playback apparatus may be a digital video tape recorder.

An information recording/playback method according to the present invention includes a monitoring step of monitoring the stored volume in temporary storage means; a first controlling step of controlling the supply of the information from a tape magnetic-storage medium to the temporary storage means and controlling the supply of the information from the temporary storage means to the tape magnetic-storage medium, based on a result of monitoring given by the monitoring step; and a second controlling step of controlling the supply of the information from the temporary storage means to communication means and controlling the supply of the information from the communication means to the temporary storage means, based on the result of monitoring.

A program stored in a storage medium, according to the present invention, includes a monitoring step of monitoring the stored volume in temporary storage means; a first controlling step of controlling the supply of the information from a tape magnetic-storage medium to the temporary storage means and controlling the supply of the information from the temporary storage means to the tape magnetic-storage medium, based on a result of monitoring given by the monitoring step; and a second controlling step of controlling the supply of the information from the temporary storage means to communication means and controlling the supply of the information from the communication means to the temporary storage means, based on the result of monitoring.

A program according to the present invention causes a computer to execute: a monitoring step of monitoring the stored volume in temporary storage means; a first controlling step of controlling the supply of the information from a tape magnetic-storage medium to the temporary storage means and controlling the supply of the information from the temporary storage means to the tape magnetic-storage medium, based on a result of monitoring given by the monitoring step; and a second controlling step of controlling the supply of the information from the temporary storage means to communication means and controlling the supply of the information from the communication means to the temporary storage means, based on the result of monitoring.

In the information recording/playback apparatus according to the present invention, the stored volume in the temporary storage means is monitored. The supply of the information from the tape magnetic-storage medium to the temporary storage means and the supply of the information from the temporary storage means to the tape magnetic-storage medium are controlled based on the result of monitoring. Also, the supply of the information from the temporary storage means to the communication means and the supply of the information from the communication means to the temporary storage means are controlled based on the result of monitoring.

BEST MODE FOR CARRYING OUT THE INVENTION

The embodiments of the present invention will now be described with reference to the attached drawings. It is to be understood by those skilled in the art that the following description is preferred embodiments for showing the structure and effect of the disclosed apparatus and that the invention is not limited by any of the embodiments, unless otherwise specified, although a variety of technically preferable limitations may be imposed.

Figure 1:
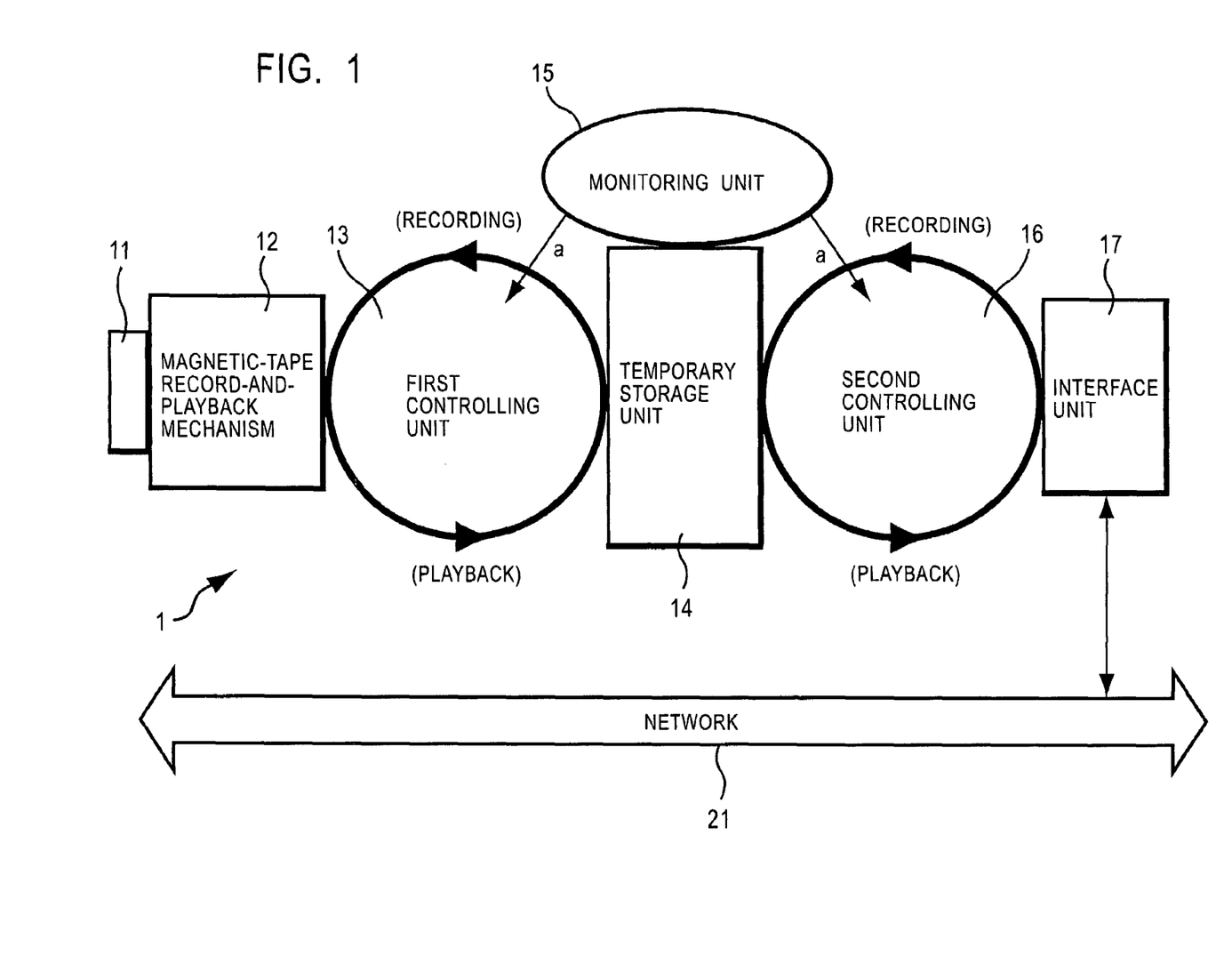
FIG. 1 is a block diagram showing the functional structure of an asynchronous VTR according to an embodiment of an information recording/playback apparatus of the present invention.

FIG. 1 is a block diagram showing the functional structure of an asynchronous VTR according to an embodiment of an information recording/playback apparatus of the present invention. Referring to FIG. 1, the asynchronous VTR 1 includes a magnetic-tape record-and-playback mechanism 12 for recording and playing back data on and from a loaded tape magnetic-storage medium 11, a temporary storage unit 14 for temporarily storing data played back from the tape magnetic-storage medium 11 and data downloaded from a network 21 for recording, a monitoring unit 15 for regularly monitoring the state of information stored in the temporary storage unit 14 and supplying a result a of monitoring, a first controlling unit 13 for controlling the information transfer between the tape magnetic-storage medium 11 and the temporary storage unit 14 based on the result a of monitoring, a second controlling unit 16 for controlling the information transfer between the temporary storage unit 14 and the network 21 (an interface unit 17) based on the result a of monitoring, and the interface unit 17, serving as a communicating unit, for interfacing between the network 21 and the temporary storage unit 14 to communicate with the network 21.

Figure 2:
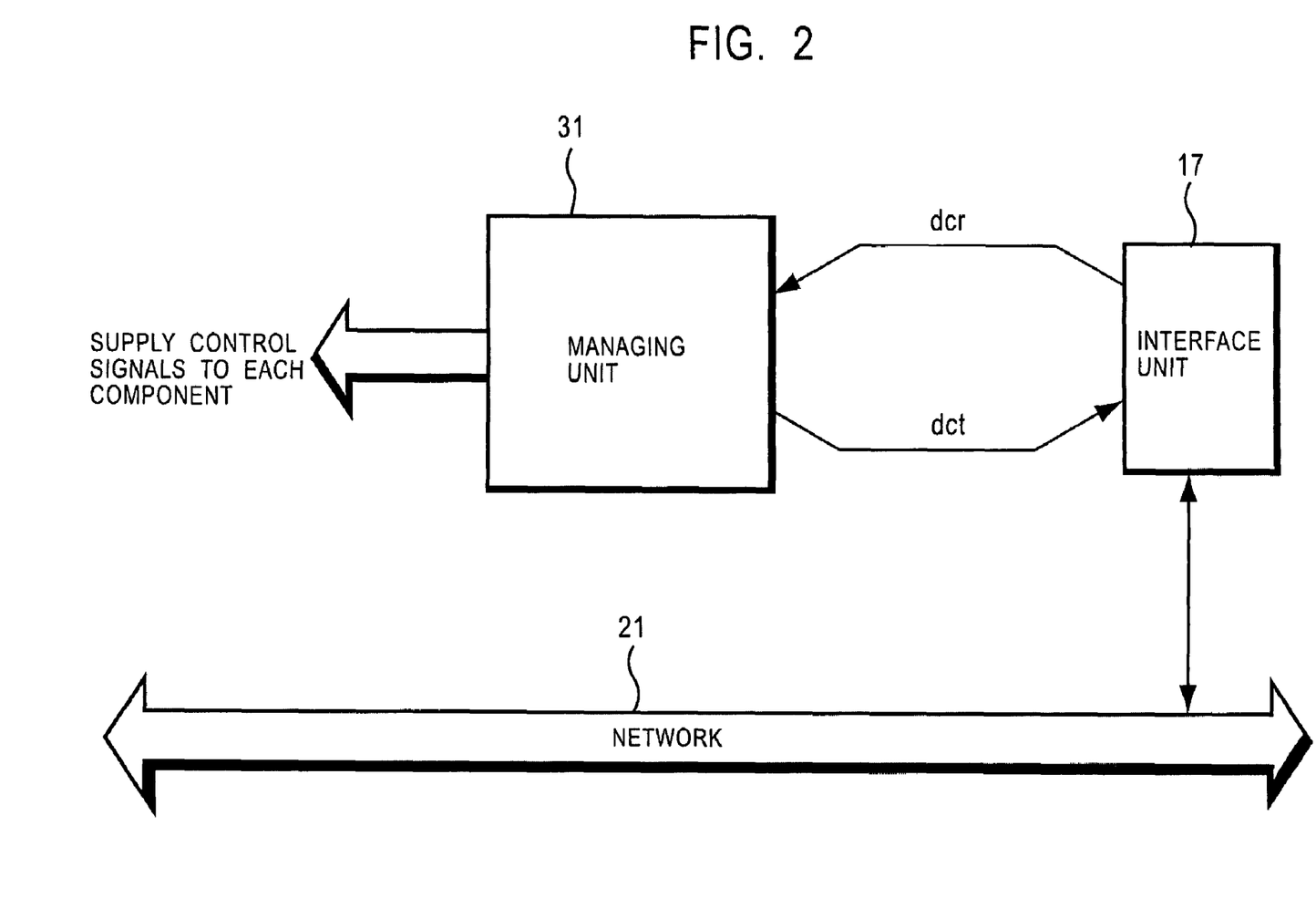
FIG. 2 is a block diagram showing another aspect of the functional structure of the asynchronous VTR in FIG. 1.

Referring to FIG. 2, the asynchronous VTR 1 further includes a managing unit 31, serving as a supervisor, for managing the entire operation of the apparatus.

The asynchronous VTR 1 is preferably used as a computer system having a network connection function and has a processor (central processing unit (CPU)), memories such as a RAM serving as a temporary storage or a working memory and a ROM containing CPU-readable-executable programs, buses, and so on. The actual structure of the asynchronous VTR 1 will be described below with reference to FIG. 3.

The components included in the asynchronous VTR 1 are provided as the programs that are readable and executable by the processor (CPU) in the asynchronous VTR 1, provided as hardware resources, such as a dedicated circuit or a dedicated chip, or provided as a combination of the programs and the hardware resources. The structure and type of the components are not limited and not restricted as long as the components can carry out predetermined functions.

For example, the managing unit 31, the monitoring unit 15, the first controlling unit 13, and the second controlling unit 16 are preferably provided as the programs that are readable and executable by the CPU. The temporary storage unit 14 is preferably a rapid-random-access semiconductor memory device having a dual-port structure.

The operation of the asynchronous VTR 1 will now be schematically described. The detailed operation will be described with reference to flowcharts below.

Referring to FIG. 2, the managing unit 31 receives commands and/or control data dcr that are sent from external equipment, such as a remote computer, to the asynchronous VTR 1 through the network 21 and parses them to supply control signals to each component in the apparatus or to generate commands and/or control data dct for sending them through the network 21.

The following describes a case in which the asynchronous VTR 1 is given instructions to play back information and then record it as the commands sent from the external equipment. The managing unit 31 issues instruction signals to each component in the apparatus upon receipt of the instructions.

When the instruction to play back the information is issued from the managing unit 31, the magnetic-tape record-and-playback mechanism 12 plays back the recorded information from the loaded tape magnetic-storage medium 11, decodes the played back information, and stores the decoded information in the temporary storage unit 14. The stored information is extracted from the temporary storage unit 14 based on the first-in-first-out principle to be supplied as output for playback to the network 21 through the interface unit 17. During this playback processing, the monitoring unit 15 regularly monitors the state of information stored in the temporary storage unit 14 and issues the notification of the corresponding result a of monitoring when the stored volume in the temporary storage unit 14 decreases to a predetermined playback lower limit or when it increases to a predetermined playback upper limit.

Upon receipt of the notification that the stored volume decreases to the lower limit, the second controlling unit 16 suspends the extraction of the information from the temporary storage unit 14 and waits for an increase in the stored volume in the temporary storage unit 14; whereas the first controlling unit 13 causes the inactivated magnetic-tape record-and-playback mechanism 12 to resume the playback operation in order to increase the stored volume in the temporary storage unit 14.

In contrast, upon receipt of the notification that the stored volume increases to the upper limit, the first controlling unit 13 causes the activated magnetic-tape record-and-playback mechanism 12 to suspend the playback operation in order to decrease the stored volume in the temporary storage unit 14; whereas the second controlling unit 16 continues the extraction of the information from the temporary storage unit 14.

When the instruction to record the information is issued from the managing unit 31, the information to be recorded that is supplied through the network 21 is stored in the temporary storage unit 14 through the interface unit 17. The information stored in the temporary storage unit 14 is extracted based on the first-in-first-out principle and is recorded on the loaded tape magnetic-storage medium 11 by the magnetic-tape record-and-playback mechanism 12. During this recording processing, the monitoring unit 15 regularly monitors the state of information stored in the temporary storage unit 14 and issues the notification of the corresponding result a of monitoring when the stored volume in the temporary storage unit 14 decreases to a predetermined recording lower limit or when it increases to a predetermined recording upper limit.

Upon receipt of the notification that the stored volume decreases to the lower limit, the first controlling unit 13 causes the magnetic-tape record-and-playback mechanism 12 to suspend the recording operation and also suspends the extraction of the information from the temporary storage unit 14, and waits for the increase in the stored volume in the temporary storage unit 14; whereas the second controlling unit 16 continues the extraction of the information in order to increase the stored volume in the temporary storage unit 14.

In contrast, upon receipt of the notification that the stored volume increases to the upper limit, the first controlling unit 13 causes the magnetic-tape record-and-playback mechanism 12 to resume the suspended recording operation in order to decrease the stored volume in the temporary storage unit 14.

As described above, the first controlling unit 13 controls the information transfer between the tape magnetic-storage medium 11 and the temporary storage unit 14 based on the result a of monitoring, while the second controlling unit 16 controls the information transfer between the temporary storage unit 14 and the network 21 (interface unit 17). The operation of the first controlling unit 13 and that of the second controlling unit 16 do not interfere with each other and they are independently performed asynchronously with each other. This asynchronous structure permits asynchronous information transfer to other apparatuses through the interface unit 17 and the network 21.

The network 21 is preferably a communication network conforming to the Transmission Control Protocol/Internet Protocol (TCP/IP) standards, such as the Internet used in the World Wide Web (Web), as well as the 100Base-T or the Gigabit Ethernet (trademark) (100base-X) for an ultra high bandwidth as a LAN. The interface unit 17 has a structure corresponding to each network. As described above, according to this embodiment of the present invention, for example, only a LAN may be used for connecting to external equipment, thus simplifying the connection. Accordingly, the overall system is inexpensively structured and therefore simplified installation and modification are realized.

Figure 3:
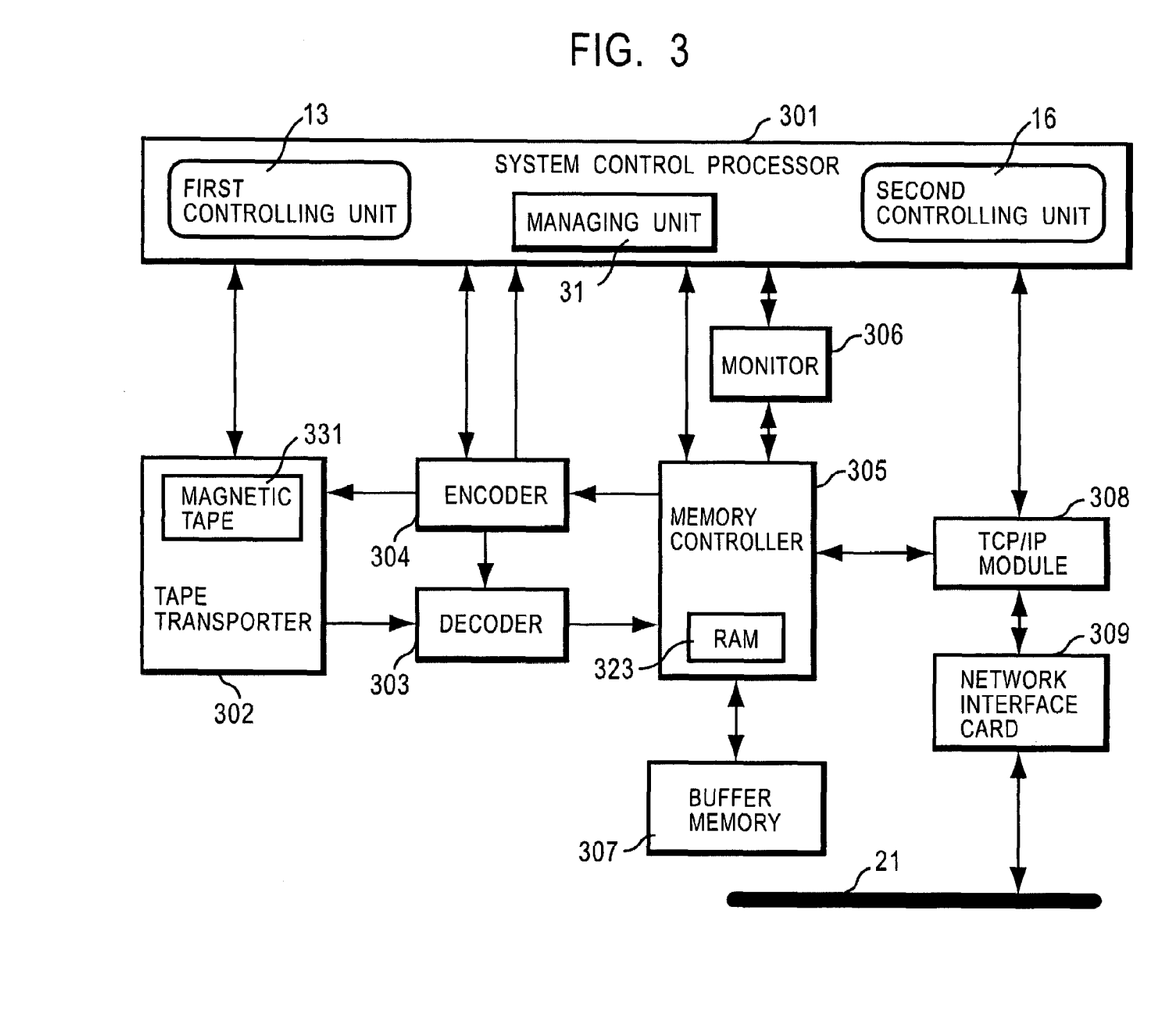
FIG. 3 is a block diagram showing the structure of the main part of the asynchronous VTR to which the present invention is applied.

FIG. 3 shows the structure of the main part of an asynchronous digital VTR corresponding to the asynchronous VTR 1 in FIG. 1. A system control processor 301 that is a built-in computer realizes the managing unit 31, the first controlling unit 13, and the second controlling unit 16 by a CPU included in the system control processor 301 that reads the program to execute it. A tape transporter (TTP) 302 controls the feed of a magnetic tape 331, which corresponds to the tape magnetic-storage medium 11 in FIG. 1, under the control of the system control processor 301 during recording and playback of images and voices. The TTP 302, a decoder 303 for decoding signals, and an encoder 304 for encoding the signals correspond to the magnetic-tape record-and-playback mechanism 12 in FIG. 1. A memory controller 305, a monitor 306 (corresponding to the monitoring unit 15 in FIG. 1), a TCP/IP module 308, and a network interface card (NIC) 309 are modules, each having a dedicated logic circuit, but they are not limited to such modules. The TCP/IP module 308 and the NIC 309 correspond to the interface unit 17 in FIG. 1.

In a playback mode, the decoder 303 decodes image and voice signals from the magnetic tape 331 to generate image and voice data that is stored in a buffer memory 307 (corresponding to the temporary storage unit 14 in FIG. 1) through the memory controller 305. The stored volume in the buffer memory 307 is regularly monitored by the monitor 306. When the stored volume in the buffer memory 307 is greater than or equal to a predetermined upper limit, the system control processor 301 drives the first controlling unit 13 that causes the TTP 302 to suspend the tape feed and to be in a waiting mode. When the stored volume in the buffer memory 307 is less than or equal to a predetermined lower limit, the first controlling unit 13 in the system control processor 301 repeats a sequence operation including the resumption of the tape feed in the TTP 302, the supply of the subsequent image and voice signals to the decoder 303, and the storing of the decoded data in the buffer memory 307.

The extraction of the image and voice data from the buffer memory 307 is controlled by the second controlling unit 16 in the system control processor 301. When the storage information supplied from the monitor 306 shows that the transmitted data is available in the buffer memory 307, the second controlling unit 16 extracts the image and voice data from the buffer memory 307 in accordance with the bandwidth of a network for data transmission and transmits the extracted data to the network 21 through the TCP/IP module 308 and the NIC 309.

As described above, in the playback mode, the first controlling unit 13 determines only the state of data stored in the buffer memory 307 to control the tape feed and the suspension and resumption of the playback operation. In other words, the first controlling unit 13 controls the tape feed independently of the second controlling unit 16 that controls the data transmission to the network 21. In contrast, the second controlling unit 16 controls the data transmission based on the state of the network 21 and the state of data stored in the buffer memory 307. In other words, the second controlling unit 16 controls the data transmission independently of the first controlling unit 13 that controls the tape feed.

In the playback mode, the first controlling unit 13 and the second controlling unit 16 are constructed so as to perform the asynchronous operation independently of each other through the buffer memory 307.

In a recording mode, the second controlling unit 16 in the system control processor 301 downloads image and voice data distributed at any rate that is lower than the recording speed of the apparatus from the network 21. The memory controller 305 stores the downloaded data through the NIC 309 and the TCP/IP module 308 in the buffer memory 307. The stored volume in the buffer memory 307 is regularly monitored by the monitor 306. When the stored volume in the buffer memory 307 is greater than or equal to a predetermined upper limit, the first controlling unit 13 in the system control processor 301 extracts the image and voice data from the buffer memory 307 and also activates the TTP 302 to start the recording operation. When the stored volume in the buffer memory 307 is less than or equal to a predetermined lower limit, the first controlling unit 13 in the system control processor 301 causes the TTP 302 to suspend the recording operation and to be in a waiting mode. When the stored volume in the buffer memory 307 recovers to a value greater than the predetermined lower limit, the first controlling unit 13 in the system control processor 301 repeats a sequence operation including the reactivation of the TTP 302 and the resumption of the recording operation from the suspended position.

As described above, in the recording mode, the first controlling unit 13 is constructed so as to asynchronously control the recording operation, mainly the tape feed, based on only the state of data stored in the buffer memory 307, irrespective of the data transmission rate from the network 21.

Figure 4:
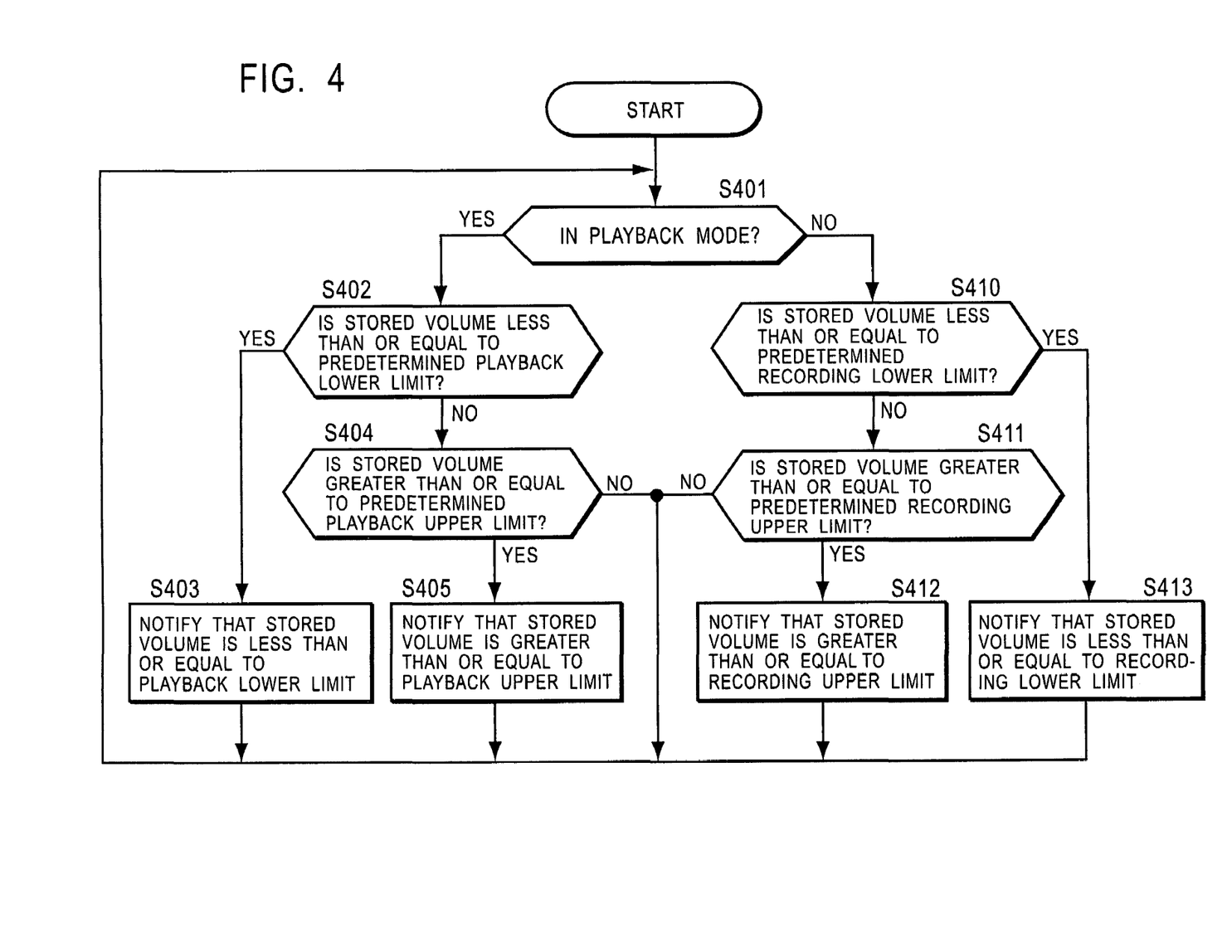
FIG. 4 is a flowchart describing the operation of a monitor of the asynchronous VTR in FIG. 3.
Figure 5:
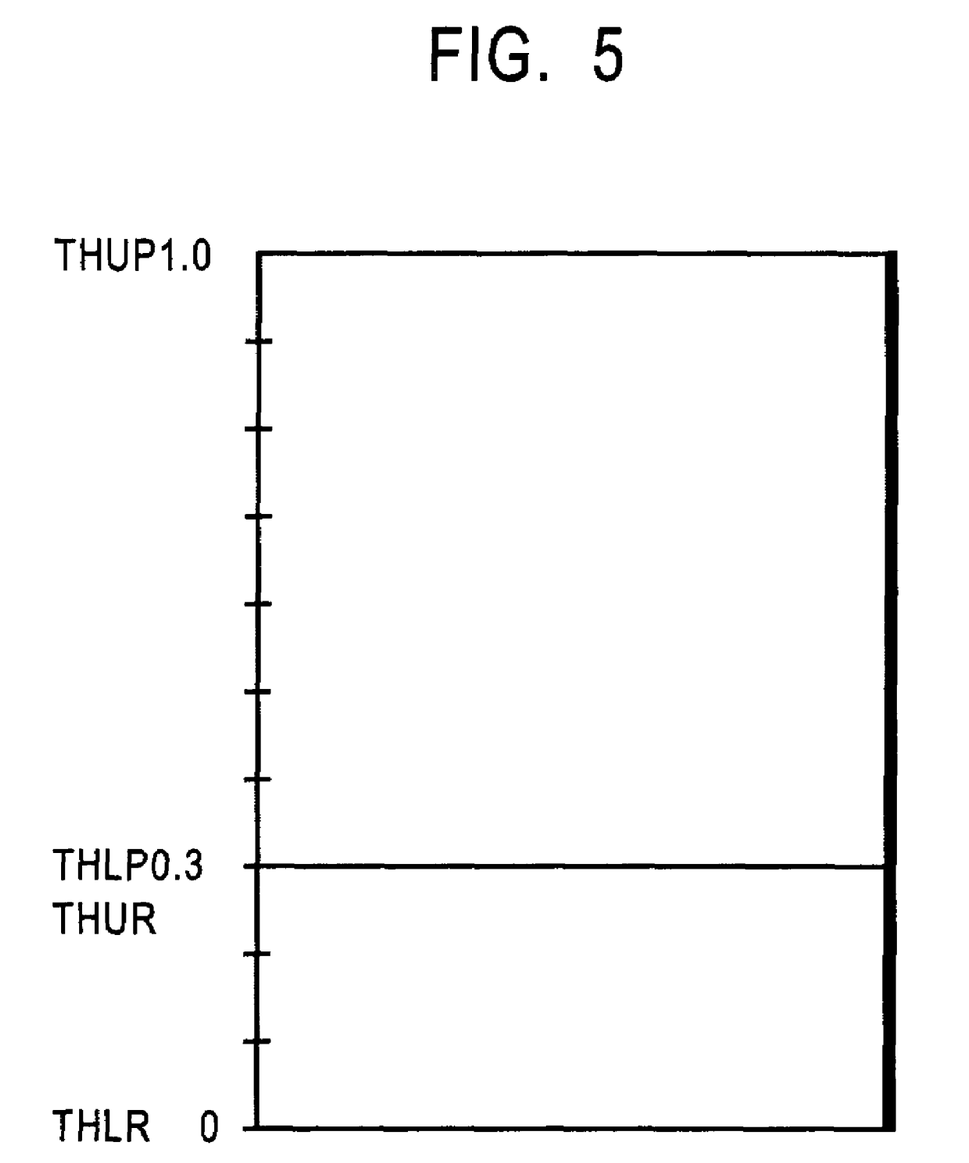
FIG. 5 is a diagram for describing the storage capacity of a buffer memory in FIG. 3.

The operation of the components in the asynchronous VTR 1 will be described in detail. The process of the monitor 306 in the asynchronous VTR 1 will now be described with reference to a flowchart in FIG. 4 and FIG. 5. In Step S401, the monitor 306 determines whether the playback mode is set. If the playback mode is not set (the recording mode is set), the process proceeds to Step S410. In Step S410, the monitor 306 determines whether the stored volume in the buffer memory 307 is less than or equal to a predetermined recording lower limit THLR. The recording lower limit THLR is represented as, for example, "0.3" as shown in FIG. 5, when the capacity of the overall buffer memory 307 is represented as "1.0". If the stored volume in the buffer memory 307 is less than or equal to the recording lower limit THLR, the process proceeds to Step S413. In Step S413, the monitor 306 notifies the first controlling unit 13 and the second controlling unit 16 that the stored volume in the buffer memory 307 is less than or equal to the predetermined recording lower limit. The process then returns to Step S401.

If the monitor 306 determines that the stored volume in the buffer memory 307 exceeds the recording lower limit THLR in Step S410, the process proceeds to Step S411. In Step S411, the monitor 306 determines whether the stored volume in the buffer memory 307 is greater than or equal to a predetermined recording upper limit THUR. The recording upper limit THUR is represented as, for example., "0.3" as shown in FIG. 5. If the stored volume in the buffer memory 307 is below the recording upper limit THUR, the process returns to Step S401. If the monitor 306 determines that the stored volume in the buffer memory 307 is greater than or equal to the recording upper limit THUR in Step S411, the process proceeds to Step S412. In Step S412, the monitor 306 notifies the first controlling unit 13 and the second controlling unit 16 that the stored volume in the buffer memory 307 is greater than or equal to the predetermined recording upper limit. The process then returns to Step S401.

If the monitor 306 determines that the playback mode is set in Step S401, the process proceeds to Step S402. In Step S402, the monitor 306 determines whether the stored volume in the buffer memory 307 is less than or equal to a predetermined playback lower limit THLP. The playback lower limit THLP is represented as, for example, "0.3" as shown in FIG. 5. If the stored volume in the buffer memory 307 is less than or equal to the playback lower limit THLP, the process proceeds to Step S403. In Step S403, the monitor 306 notifies the first controlling unit 13 and the second controlling unit 16 that the stored volume in the buffer memory 307 is less than or equal to the predetermined playback lower limit. The process then returns to Step S401. If the monitor 306 determines that the stored volume in the buffer memory 307 exceeds the playback lower limit THLP in Step S402, the process proceeds to Step S404. In Step S404, the monitor 306 determines whether the stored volume in the buffer memory 307 is greater than or equal to a predetermined playback upper limit THUP. The playback upper limit THUP is represented as, for example, "1.0" as shown in FIG. 5. If the stored volume in the buffer memory 307 is below the playback upper limit THUP, the process returns to Step S401. If the monitor 306 determines that the stored volume in the buffer memory 307 is greater than or equal to the playback upper limit THUP in Step S404, the process proceeds to Step S405. In Step S405, the monitor 306 notifies the first controlling unit 13 and the second controlling unit 16 that the stored volume in the buffer memory 307 is greater than or equal to the predetermined playback upper limit. The process then returns to Step S401.

The monitor 306 monitors the stored volume in the buffer memory 307 as described above. If the stored volume in the buffer memory 307 is less than or equal to the recording lower limit THLR or is greater than or equal to the recording upper limit THUR or if it is less than or equal to the playback lower limit THLP or is greater than or equal to the playback upper limit THUP, the monitor 306 notifies the first controlling unit 13 and the second controlling unit 16 included in the system control processor 301 of the state of the stored volume.

In the comparison between the stored volume and reference values (threshold values), the same results are given by the determination whether the stored volume in the buffer memory 307 is below or exceeds a reference value (upper limit or lower limit), instead of the determination whether the stored volume in the buffer memory 307 is less than or equal to the reference value or whether it is greater than or equal to the reference value.

Although the playback lower limit is represented as "0.3", the playback upper limit as "1.0", the recording lower limit as "0.0", and the recording upper limit as "0.3" in FIG. 5, these limits may be set to other values. However, it is preferable that the playback lower limit be set to greater than the recording lower limit and the playback upper limit be set to greater than the recording upper limit. Such settings permit more efficient use of the buffer memory 307.

Figure 6:
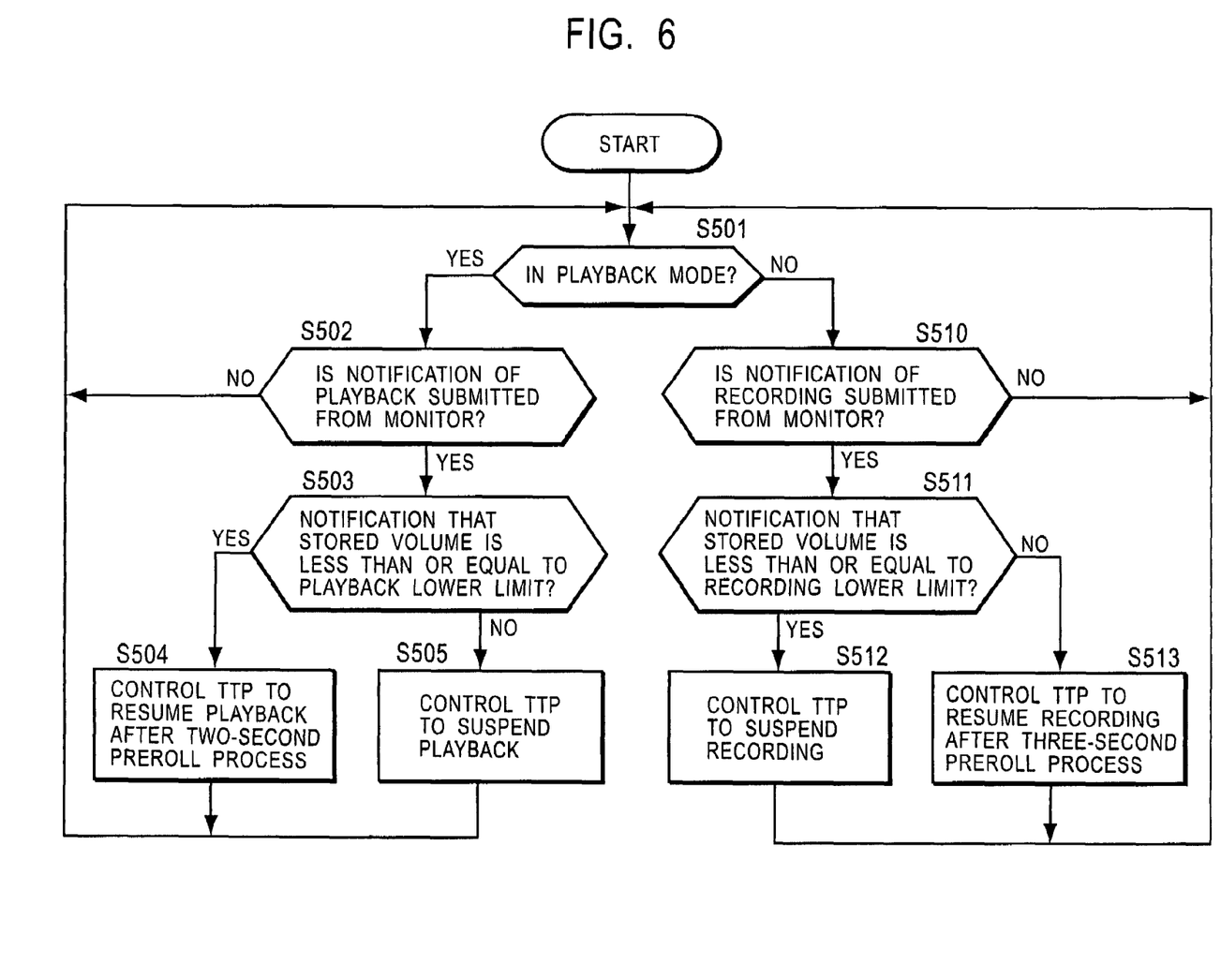
FIG. 6 is a flowchart describing the operation of a first controlling unit of the asynchronous VTR in FIG. 3.

The process of the first controlling unit 13 in the asynchronous VTR 1 will now be described with reference to a flowchart in FIG. 6. In Step S501, the first controlling unit 13 determines whether the playback mode is set. If the playback mode is not set (the recording mode is set), the process proceeds to Step S510. In Step S510, the first controlling unit 13 determines whether the monitor 306 issues a notification of the recording. If the monitor 306 does not issue the notification of the recording, the process returns to Step S501. If the first controlling unit 13 determines that the monitor 306 issues the notification of the recording in Step S510, in Step S511, the first controlling unit 13 determines the contents of the notification. If the monitor 306 notifies that the stored volume in the buffer memory 307 is less than or equal to the predetermined recording lower limit (the notification issued in Step S413 in FIG. 4), the first controlling unit 13 proceeds to Step S512 because it is required to suspend the extraction of data from the buffer memory 307. In Step S512, the first controlling unit 13 controls the TTP 302 to suspend the recording operation. The process then returns to Step S501.

If the first controlling unit 13 does not notify that the stored volume in the buffer memory 307 is less than or equal to the predetermined recording lower limit in Step S511, that is, if the notification that that stored volume in the buffer memory 307 is greater than or equal to the predetermined recording upper limit (the notification issued in Step S412 in FIG. 4) is issued, the first controlling unit 13 proceeds to Step S513 for resuming the suspended extraction of the data from the buffer memory 307. In Step S513, the first controlling unit 13 controls the TTP 302 to resume the suspended recording operation after a three-second preroll process. The process then returns to Step S501.

Figure 7:
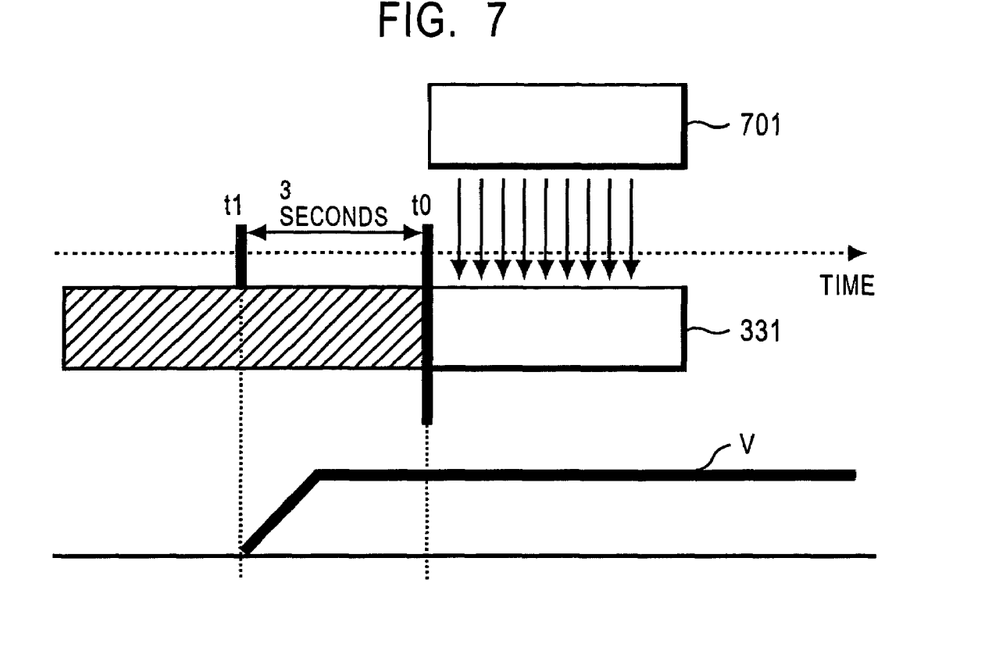
FIG. 7 is a diagram for describing a preroll process in Step S513 in FIG. 6.

In other words, when the previous recording process is suspended at time t0, the TTP 302 rewinds the magnetic tape 331 by a length corresponding to three seconds from the time t0, as shown in FIG. 7. Since one frame includes 12 tracks, the magnetic tape 331 is rewound by 1,080 tracks (by a length corresponding to three seconds from the time t0 to the previous time t1). The magnetic tape 331 then runs from the position at the time t1 at a running speed V that reaches a normal speed (double speed) after one to two seconds. At the time t0, data 701 played back from the buffer memory 307 is recorded on the magnetic tape 331. Accordingly, referring to FIG. 7, the data 701 that has been read out from the buffer memory 307 for recording is recorded on the magnetic tape 331 at the time t0 as one continuous portion (without a discontinuous portion) with data recorded on the magnetic tape 331 until the time t0, represented by using hatching.

As described above, in the recording mode, the data volume stored in the buffer memory 307 is between the recording lower limit THLR (=0) and the recording upper limit THUR (=0.3).

If the first controlling unit 13 determines that the playback mode is set in Step S501, the process proceeds to Step S502. In Step S502, the first controlling unit 13 determines whether the monitor 306 issues a notification of the playback. If the monitor 306 does not issue the notification of the playback, the process returns to Step S501. If the monitor 306 issues the notification of the playback, in Step S503, the first controlling unit 13 determines the contents of the notification. If the monitor 306 notifies that the stored volume in the buffer memory 307 is less than or equal to the predetermined playback lower limit (the notification issued in Step S403 in FIG. 4), the first controlling unit 13 proceeds to Step S504 because it is required to supply data to the buffer memory 307. In Step S504, the first controlling unit 13 controls the TTP 302 to resume the suspended playback operation of the magnetic tape 331 after a two-second preroll process. The process then returns to Step S501.

Figure 8:
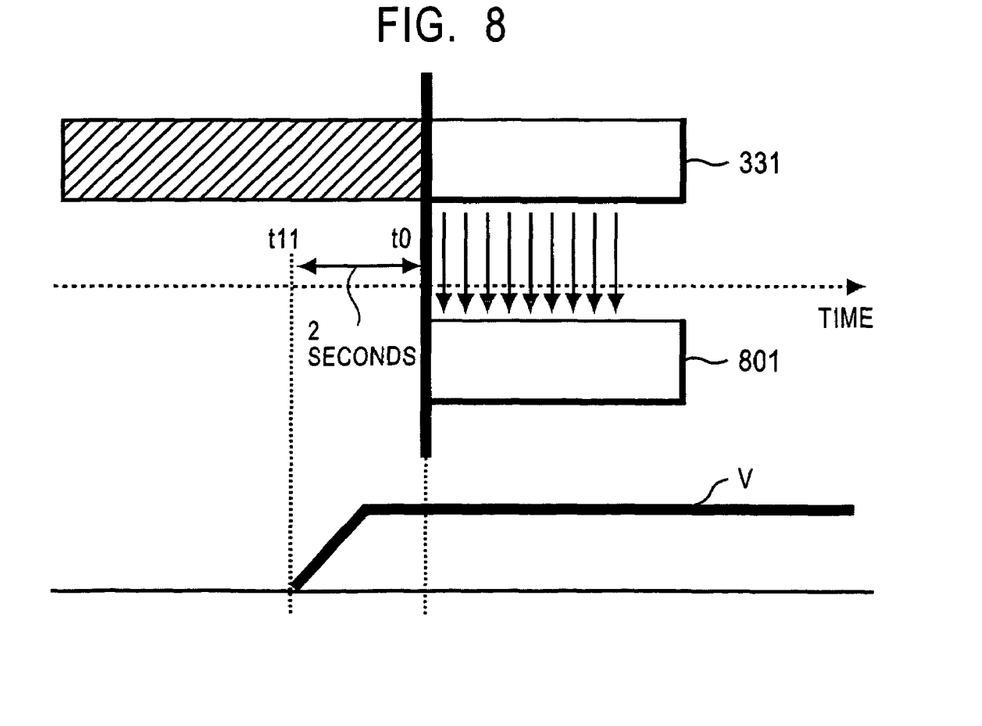
FIG. 8 is a diagram for describing a preroll process in Step S504 in FIG. 6.

The preroll process will be described with reference to FIG. 8. When the previous playback process is suspended at time t0, the magnetic tape 331 is rewound by a length corresponding to two seconds from the time t0 to a previous time t11, as shown in FIG. 8. The playback of the magnetic tape 331 is resumed from the time t11. The running speed V of the magnetic tape 331 reaches a certain speed after a predetermined time period from the time t11.

When the magnetic tape 331 has been played back till the position at the time t0, the data played back from the magnetic tape 331 is subsequently transferred to the buffer memory 307 to be recorded thereon; whereas the data played back until the time t0 from the magnetic tape 331 is not transferred to the buffer memory 307. The memory controller 305 stores time codes of video data, to be recorded in the buffer memory 307, in a RAM 323 included in the memory controller 305 in association with a memory address in the buffer memory 307. Namely, the time codes corresponding to frames before the time t0 are stored in the RAM 323. The memory controller 305 monitors the time codes of the video data played back from the magnetic tape 331 to transfer video data 801 of the frame corresponding to the time code following a time code immediately before the time t0 to the buffer memory 307 and store the transferred data in the buffer memory 307. Accordingly, the continuity of the video data is maintained also in the playback mode.

In order to record or play back data on or from the magnetic tape 331, the position of tracks on the magnetic tape 331 must precisely coincide with the position and height of a rotary head (not shown) included in the TTP 302 and therefore the preroll process is performed.

The TTP 302 has a dynamic tracking function for vertically and precisely moving the position of the rotary head mounted on a rotating drum (not shown) by using a bimorph (not shown). This dynamic tracking function allows the position of the rotary head to be adjusted such that the maximum envelope level of playback signals fed through the rotary head is attained. As a result, even when the position of the tracks on the magnetic tape 331 slightly shifts from the position and height of the rotary head, the trace position of the rotary head can be rapidly adjusted in accordance with the position of the tracks on the magnetic tape 331.

Less accurate adjustment of the trace position of the rotary head and the position of the tracks on the magnetic tape 331 is required in the playback mode than in the recording mode. Hence, the time period of the preroll process is set to a smaller value in the playback mode than in the recording mode, thus achieving the rapid playback operation.

If the first controlling unit 13 does not notify that the stored volume in the buffer memory 307 is less than or equal to the predetermined playback lower limit in Step S503, that is, if the notification that that stored volume in the buffer memory 307 is greater than or equal to the predetermined playback upper limit (the notification issued in Step S405 in FIG. 4) is issued, the first controlling unit 13 proceeds to Step S505 because it is required to suspend the data supply to the buffer memory 307. In Step S505, the first controlling unit 13 controls the TTP 302 to suspend the playback operation. The process then returns to Step S501.

As described above, in the playback mode, the data volume stored in the buffer memory 307 is between the playback lower limit THLP (=0.3) and the playback upper limit THUP (=1.0).

In this manner, the first controlling unit 13 operates independently of the second controlling unit 16.

Figure 9:
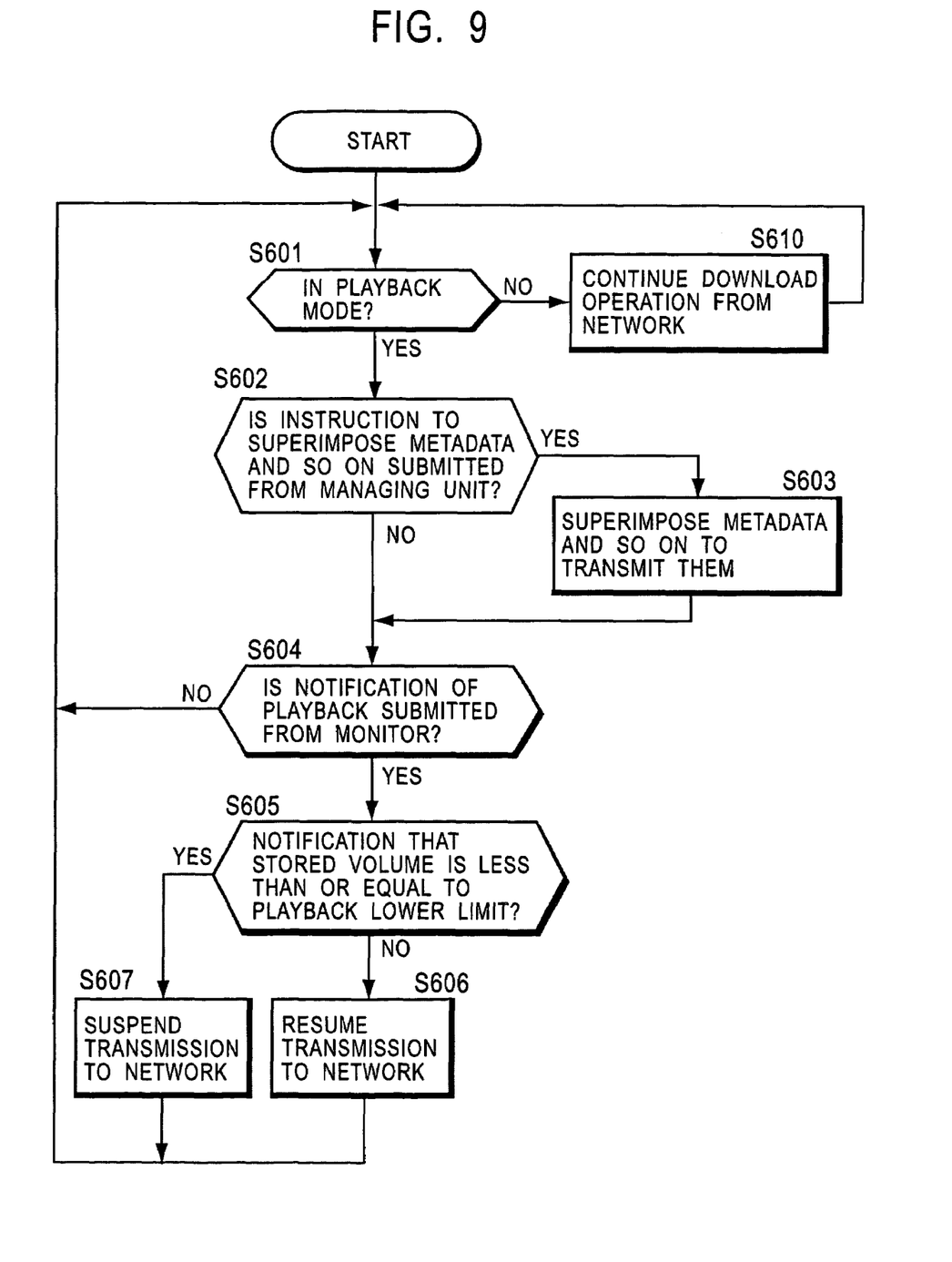
FIG. 9 is a flowchart describing the operation of a second controlling unit of the asynchronous VTR in FIG. 3.

The process of the second controlling unit 16 in the asynchronous VTR 1 will now be described with reference to a flowchart in FIG. 9. In Step S601, the second controlling unit 16 determines whether the playback mode is set. If the playback mode is not set (the recording mode is set), the process proceeds to Step S610. In Step S610, the second controlling unit 16 continues to download the data from the network 21. The process then returns to Step S601. If the playback mode is set in Step S601, the process proceeds to Step S602. In Step S602, the second controlling unit 16 determines whether the managing unit 31 issues an instruction to superimpose metadata and so on. If the managing unit 31 issues the instruction, in Step S603, the second controlling unit 16 superimposes the metadata and the like on data played back from the magnetic tape 331 to transmit the superimposed data to the network 21 through the TCP/IP module 308 and the NIC 309 (the interface unit 17).

If the second controlling unit 16 determines that the managing unit 31 does not issue the instruction in Step S602, or after the transmission process in Step S603, the process proceeds to Step S604. In Step S604, the second controlling unit 16 determines whether the monitor 306 issues a notification of the playback. If the monitor 306 does not issue the notification, the process returns to Step S601. If the monitor 306 issues the notification, in Step S605, the second controlling unit 16 determines the contents of the notification. If the monitor 306 issues the notification that the stored volume in the buffer memory 307 is less than or equal to the playback lower limit (the notification issued in Step S403 in FIG. 4), the process proceeds to Step S607. In Step S607, the second controlling unit 16 suspends the transmission of the playback data to the network 21. The process then returns to Step S601.

If the monitor 306 does not issue the notification that the stored volume in the buffer memory 307 is less than or equal to the playback lower limit, that is, if the notification that the stored volume in the buffer memory 307 is greater than or equal to the predetermined playback upper limit (the notification issued in Step S405 in FIG. 4) is issued, the process proceeds to Step S606. In Step S606, the second controlling unit 16 resumes the suspended transmission of the playback data to the network 21. The process then returns to Step S601.

In this manner, the second controlling unit 16 operates independently of the first controlling unit 13.

As described above, the independent operation of the first controlling unit 13 and the second controlling unit 16 and the presence of the buffer memory 307 serving as an interface enable information asynchronously input and output to be processed.

Figure 10:
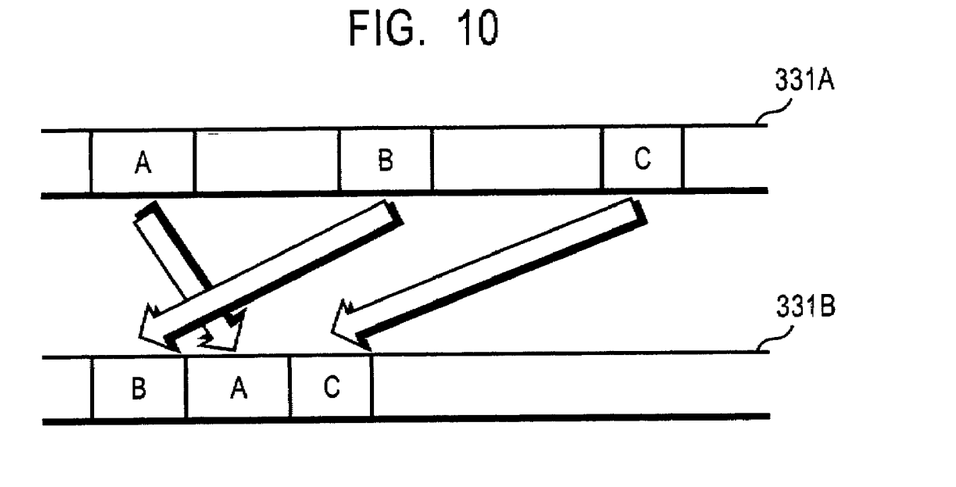
FIG. 10 is a diagram for describing an editing process performed by the asynchronous VTR in FIG. 3.

Two asynchronous VTRs 1 with the structure described above permit actual editing process even when they have no special editing function. FIG. 10 shows an example of the editing process.

In this example, a magnetic tape 331A has scenes A, B, and C recorded in this order at predetermined intervals.

When scene B, scene A, and scene C are sequentially played back from the magnetic tape 331A, the scenes B, A, and C are continuously recorded on another magnetic tape 331B in this order without intervals.

Figure 11:
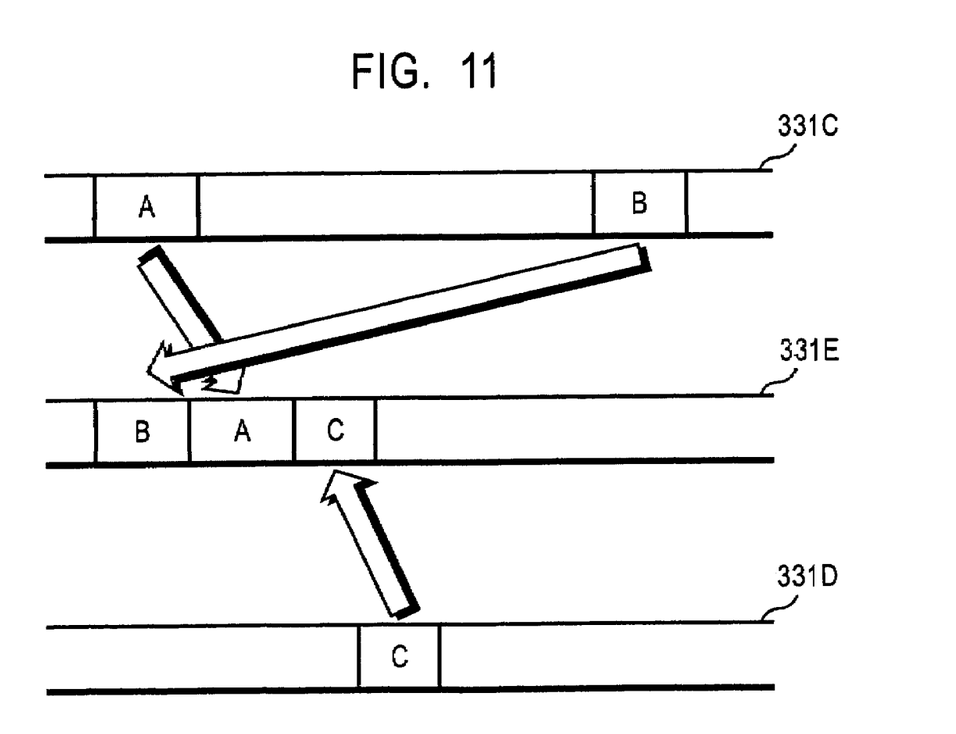
FIG. 11 is a diagram for describing another editing process performed by the asynchronous VTR in FIG. 3.

FIG. 11 shows another example of the editing process in which scenes A and B are recorded on a magnetic tape 331C at a predetermined interval and a scene C is recorded on a magnetic tape 331D.

When scene B and scene A are sequentially played back from the magnetic tape 331C and then scene C is played back from the magnetic tape 331D for recording the scenes B, A, and C on a magnetic tape 331E, the scenes B, A, and C are continuously recorded on the magnetic tape 331E without intervals.

As described above, providing a plurality of asynchronous VTRs 1, connecting each of them to a network (LAN), and transferring data played back by one of the plurality of asynchronous VTRs 1 to another asynchronous VTR 1 to record the transferred data thereon allow the simple and reliable edit process to be rapidly performed without the editing function. In this process, only ordinary network connection is required and no complicated connection is necessary.

It is also possible to distribute video data from the asynchronous VTR 1 having the structure shown in FIG. 3 to other apparatuses through the network 21 in a so-called on-demand method. In other words, the asynchronous VTR 1 can packetize the video data that is asynchronously distributed each time it receives a request from the other apparatuses through the network 21.

When the asynchronous VTR 1 further has a low-resolution encoder (not shown) for converting high-definition video data played back from the magnetic tape 331 into low-definition video data, the asynchronous VTR 1 can convert video data decoded by the decoder 303 into the low-definition video data with the low-resolution encoder to asynchronously distribute the low-definition video data to other apparatuses through the network 21.

The structure according to the present invention is a suggestion for matching synchronous data sending-receiving environment with asynchronous data processing environment. As a result of asynchronous operation, idle processing capacity may be produced during a certain period. A plurality of jobs can be performed simultaneously by using the idle processing capacity, thus achieving increased operation efficiency. This is an advantage that is not given by known synchronous applications in which other jobs are waiting until one job is completed.

Information to be recorded and played back is not limited to the video and sound information described above. For example, "metadata" can be asynchronously transferred as incidental or accompanying information through a network. An application of a media exchange format (MXF) that is a standard file format is preferable for transferring, recording, and playing back such incidental or accompanying information.

Recording and playing back content data in the MXF file format gives a syntax structure in which the metadata is easily written on and read from the header and the correspondence between the metadata and the essence (body) is stored in the header. With this structure, the metadata can easily be extracted, thus improving the operation efficiency of file processing.

The present invention can embody the following advantages.

1. In known synchronous environments, special control is necessary for maintaining the synchronous operation; whereas, in asynchronous environments suggested in the present invention, asynchronous operation, which is not restricted by time, extends the range to which an information recording/playback apparatus, such as a VTR, is applied.
2. Even when the bandwidth of a transmission path used for sending data is narrower than the bandwidth used for playing back the data by the VTR or even when the transmission rate is varied in the application of a network connected to a plurality of nodes, the VTR can output the data.
3. Even when video and voice data is input at a lower transmission rate than a rate at which the data is recorded on the VTR, the data can be recorded.
4. Data on tapes can be handled in files on a computer, so that handling of a large amount of video and voice data is facilitated.
5. The first controlling unit controls tape running to sequentially store each of at least two scenes recorded on different positions on the tape medium in a buffer memory. The second controlling unit extracts the recorded scenes based on the first-in-first-out principle to send them. In such a case, the receiver can record the scenes as one continuous scene.
6. Since a plurality of jobs can be performed simultaneously, unlike known synchronous applications in which other jobs are waiting until one job is completed, applications with increased operation speed can be developed.
7. Simple connection allows the overall system to be inexpensively structured and therefore simplified installation and modification are realized.

When an asynchronous VTR according to the present invention operates in the recording mode through a network in the embodiments described above, the asynchronous VTR may notify a sending device (any of other asynchronous VTRs, known VTRs, and synchronous device, such as a disc recorder) of the receiving state of the information in the asynchronous VTR through the network. With such a structure, when the sending device adjusts the sending rate in accordance with the receiving state of the information in the receiving asynchronous VTR, the receiving asynchronous VTR can smoothly receive and record the information. Additionally, when the sending device is notified in advance of the recording rate at the receiving asynchronous VTR and when the sending rate of the information from the sending device is below the recording rate at the receiving asynchronous VTR, the second controlling unit in the receiving asynchronous VTR is only required to receive the input information and store it in the buffer memory, as in the embodiments described above.

INDUSTRIAL APPLICABILITY

An information recording/playback apparatus according to the present invention regularly monitors the state of information stored in a temporary storage, controls the information transfer between a tape magnetic-storage medium and the temporary storage based on the result of monitoring, and also controls the information transfer between the temporary storage and a network. Since the information recording/playback apparatus asynchronously performs the control between the tape magnetic recording medium and the temporary storage and the control between the temporary storage and the network independently of each other, asynchronous information transfer to other apparatuses is realized.

Since each control is asynchronously performed, any other processing can be performed between the control processes, thus improving the operating efficiency.

The invention claimed is:

1. An information recording/playback apparatus temporary storage means for temporarily storing the information played back from the tape magnetic-storage medium and the information to be recorded on the tape magnetic-storage medium;
   monitoring means for monitoring the stored volume in the temporary storage means;
   first controlling means for controlling the supply of the information from the tape magnetic-storage medium to the temporary storage means and for controlling the supply of the information from the temporary storage means to the tape magnetic-storage medium, based on a result of monitoring given by the monitoring means;
   communication means for communicating with an asynchronous communication channel; and
   wherein the monitoring means compares the stored volume in the temporary storage means with a first lower limit and a first upper limit in the playback of the information from the tape magnetic-storage medium and compares the stored volume in the temporary storage means with a second lower limit and a second upper limit in the recording of the information on the tape magnetic-storage medium.

2. An information recording/playback apparatus according to claim 1, wherein the first controlling means suspends the playback of the information from the tape magnetic-storage medium when the stored volume in the temporary storage means is greater than or equal to the first upper limit;
   resumes the playback of the information from the tape magnetic-storage medium when the stored volume in the temporary storage means is less than or equal to the first lower limit;
   suspends the recording of the information on the tape magnetic-storage medium when the stored volume in the temporary storage means is less than or equal to the second lower limit; and
   resumes the recording of the information on the tape magnetic-storage medium when the stored volume in the temporary storage means is greater than or equal to the second upper limit.

3. An information recording/playback apparatus according to claim 2, wherein the first controlling means prerolls the tape magnetic-storage medium at the time of resumption of the suspended playback of the information from the tape magnetic-storage medium or at the time of resumption of the suspended recording of the information on the tape magnetic-storage medium.

4. An information recording/playback apparatus according to claim 3, wherein the first controlling means prerolls the tape magnetic-storage medium for a longer time in the recording than in the playback.

5. An information recording/playback apparatus according to claim 1, wherein the second controlling means suspends the supply of the information to the communication means when the stored volume in the temporary storage means is less than or equal to the first lower limit and resumes the supply of the information to the communication means when the stored volume in the temporary storage means is greater than or equal to the first upper limit.

* * * * *